United States Patent [19]

Konishi et al.

[11] Patent Number: 4,899,213
[45] Date of Patent: Feb. 6, 1990

[54] A SYSTEM FOR PRODUCING IMAGE SIGNALS OF A SUBJECT IMAGE BY AN IMAGE SENSING DEVICE

[76] Inventors: Masahiro Konishi; Masafumi Inuiya; Akira Muramatsu; Masahiro Kato, all of 2-26-30 Nishi-azabu, Minato-ku, Tokyo, Japan

[21] Appl. No.: 366,220

[22] Filed: Jun. 12, 1989

Related U.S. Application Data

[63] Continuation of Ser. No. 8,165, Jan. 29, 1987, abandoned.

[30] Foreign Application Priority Data

Jan. 29, 1986 [JP]  Japan .................................. 61-17163

[51] Int. Cl.⁴ ........................ H04N 9/077; H04N 9/04
[52] U.S. Cl. .......................................... 358/44; 358/41
[58] Field of Search .............................. 358/41, 43, 44

[56] References Cited

U.S. PATENT DOCUMENTS

| | | | |
|---|---|---|---|
| 4,200,883 | 4/1980 | Yamanaka et al. | 358/44 |
| 4,339,771 | 7/1982 | Morishita et al. | 358/41 |
| 4,480,266 | 10/1984 | Hashimoto | 358/43 |
| 4,527,190 | 7/1985 | Onga et al. | 358/44 |
| 4,768,084 | 8/1988 | Noda et al. | 358/44 |
| 4,768,085 | 8/1988 | Hashimoto | 358/44 |

FOREIGN PATENT DOCUMENTS

| | | | |
|---|---|---|---|
| 2527032 | 11/1983 | France | 358/44 |
| 56-140788 | 11/1981 | Japan | 358/44 |
| 57-63983 | 4/1982 | Japan | 358/44 |
| 57-111193 | 7/1982 | Japan | 358/44 |
| 57-166792 | 10/1982 | Japan | 358/44 |
| 58-151789 | 9/1983 | Japan | 358/44 |
| 58-175381 | 10/1983 | Japan | 358/41 |
| 58-175382 | 10/1983 | Japan | 358/41 |

Primary Examiner—James J. Groody
Assistant Examiner—Randall S. Svihla
Attorney, Agent, or Firm—Birch, Stewart, Kolasch & Birch

[57] ABSTRACT

A system is provided for producing image signals of a photographed subject image by a solid state image sensing device and for producing a brightness signal and line sequential color difference signals from the image signal. The subject image is sensed by the image sensing device which has a color filter formed thereon. First and second horizontal scanning lines of picture elements are alternately arranged and the picture elements are opposed to filter elements of the color filter. The first horizontal scanning lines separately transmit at least red light and green light and the second horizontal scanning lines transmit at least blue light and green light, to thereby obtain color image signals. The image signal thus obtained are signal processed to produce the line sequential color difference signals $R-Y$ and $B-Y$. With this signal processing, the system can produce the image signals including the line sequential color difference signals by a simplified arrangement without impairing the color productivity.

16 Claims, 6 Drawing Sheets

A SYSTEM FOR PRODUCING IMAGE SIGNALS OF A SUBJECT IMAGE BY AN IMAGE SENSING DEVICE

This application is a continuation of application Ser. No. 008,165 filed on Jan. 29, 1987, now abandoned.

BACKGROUND OF THE INVENTION

1. Field of the Invention

This invention relates to a system for producing image signals, and more particularly to a system for producing image signals to produce a brightness signal and line sequential color difference signals from signals obtained by image-sensing of an image of a subject by means of a solid state image sensing device or the like.

2. Description of the Prior Art

Figure 6:
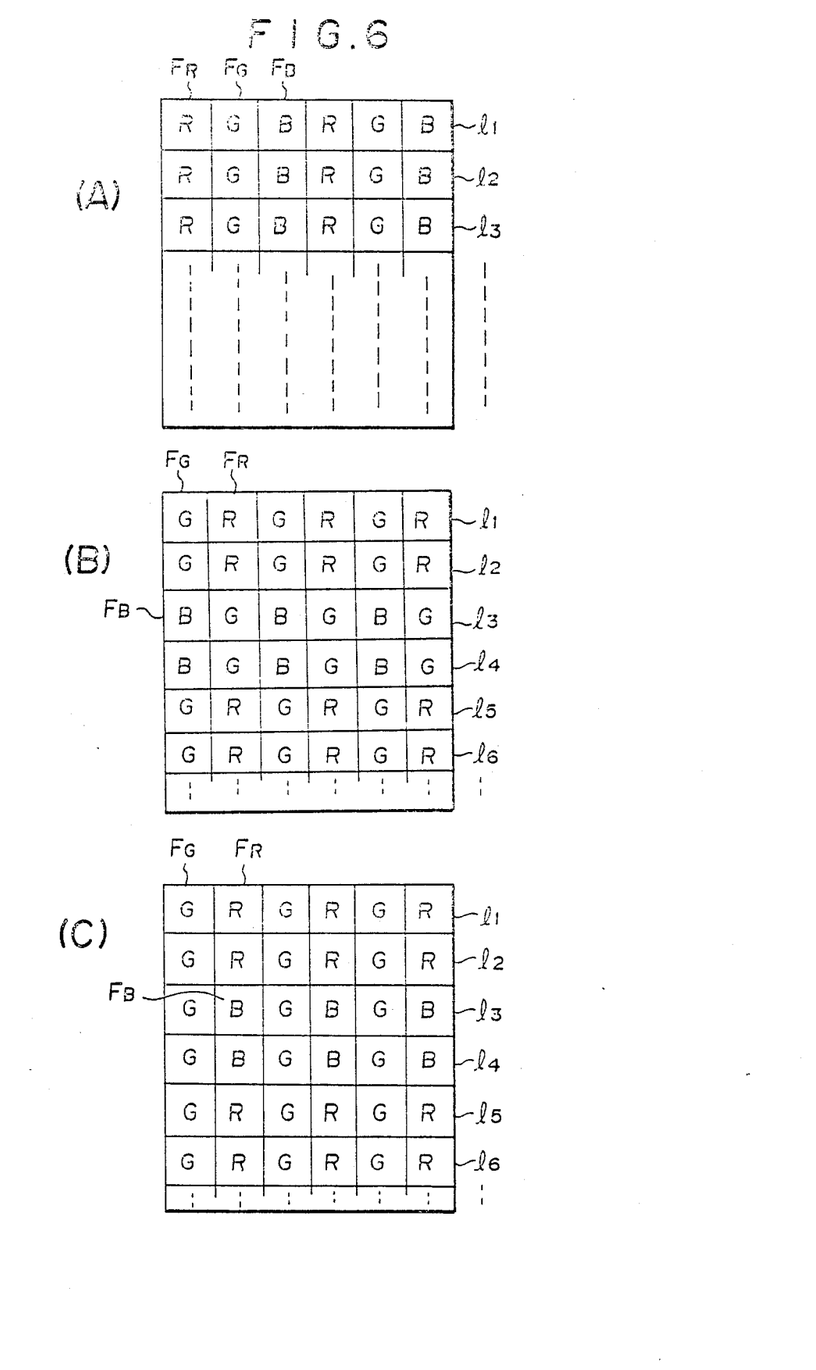
FIG. 6 is an explanatory view showing the arrangements of various color filters.

In general, an image sensing device for an electronic still camera, a video camera or the like, a solid state image sensing device such as a CCD (charge coupled device) is used. In this case, in order to record a color picture image, it is necessary to use a color filter. It is known that the color filters are of various arrangements. FIG. 6 show typical color filters. FIG. 6(A) shows an arrangement of a stripe filter, in which, the picture elements constituting the respective horizontal scanning lines $l_i$, are arranged in predetermined sequential orders. Red color filters $F_R$ being filter elements for transmitting only red light, green color filters $F_G$ being filter elements for transmitting only green light and blue color filters $F_B$ being filter elements for transmitting only blue light, so that the respective color signals R, G and B can be obtained from the respective picture elements of one horizontal scanning line of the color filter.

On the other hand, FIGS. 6(B) and 6(C) respectively show examples of arrangements of the color line sequential filter. In these examples, in order to perform interlaced scanning, two horizontal scanning lines are arranged such that the same continuous arrangements are formed in the order of $l_1 \rightarrow l_3 \rightarrow l_5$ in the first field, and in the order of $l_2 \rightarrow l_4 \rightarrow l_6$ in the second field.

The color line sequential filter is of such an arrangement that, in the picture elements constituting the horizontal scanning lines $l_1$ and $l_2$, the green color filters $F_G$ and the red color filters $F_R$ adjoin each other, and, in the picture elements constituting the horizontal scanning lines $l_3$ and $l_4$, the green color filters $F_G$ and the blue color filters $F_B$ adjoin each other. Further, in the subsequent horizontal scanning lines $l_5$ and $l_6$, the green color filters $F_G$ and the red color filters $F_R$ adjoin each other in the picture elements so that the same filter arrangement as in the horizontal scanning lines $l_1$ and $l_2$ can be obtained. As described above, in the color filter of the type described, the respective two horizontal scanning lines are arranged so as to form the same filter arrangements.

A difference between FIGS. 6(B) and 6(C) resides in that, in the former, the green color filters $F_G$ are arranged in a checkered pattern, whereas, in the latter, the green color filters are arranged in a striped pattern.

Out of the color filters described above, in the stripe filter (FIG. 6(A)), the respective color signals R, G and B can be obtained from the respective picture elements of the image sensing device associated with one horizontal scanning line, so that, color difference signals including R−Y, B−Y and brightness signal Y, which are necessary for recording color images under the NTSC (National Television System Committee) type color television system, for example, can be produced. Thus offering an advantage in reproducing the color images, however, presenting a disadvantage in reproducing the horizontal resolution.

Furthermore, in the color sequential filters (FIGS. 6(B) and 6(C)), the colors cannot be reproduced with only one horizontal scanning line, however, the horizontal resolution can be improved as compared with the stripe filter.

Now, when the color picture image is reproduced under NTSC system, if the brightness signal is indicated by Y and the color signals of three primary colors are indicated by R, G and B, then the following relationship will be established.

$$Y = 0.59G + 0.3R + 0.11B \qquad (1)$$

If the color difference signals R−Y and B−Y are indicated by R−G and B−G signals from the formula (1), then the following relationships will be established.

$$R - Y = 0.7(R - G) - 0.11(B - G) \qquad (2)$$

$$B - Y = 0.89(B - G) - 0.30(R - G) \qquad (3)$$

Further, in FIGS. 6(B) and 6(C), the signal R−G can be produced from image information obtainable from the horizontal scanning line $l_1$ and the signal B−G can be produced from picture image information obtainable from the horizontal scanning line $l_3$ for example. However, with only the picture image informations obtainable from these horizontal scanning lines $l_1$ and $l_3$, the color difference signals R−Y and B−Y cannot be produced, respectively, as apparent from the formulae (2) and (3). More specifically, the horizontal scanning line $l_1$ cannot produce the signal B−G, and the horizontal scanning line $l_3$ cannot produce the signal R−G, respectively.

However, ratios of the signal B−G in the color difference signal R−Y and the signal R−G in the color difference signal B−Y are small, respectively. Whereby, in consideration of the vertical correlations in the picture image, there is practically no problem in the picture quality even if the color difference signals R−Y and B−Y are produced by interpolating these signals with signals from one horizontal scanning period before.

The present invention has been developed to obviate the above-described disadvantages of the prior art and has as its object the provision of an electronic still camera for performing picture image recording satisfactory in resolution.

To achieve the above described object, the present invention contemplates a system for producing image signals, comprising:

image sensing means for photographing an image of a subject by means of an image sensing device formed with a color filter wherein a first horizontal scanning line arranged therein with filter elements opposed to an image sensing plane, for separably transmitting at least red light and green light and a second horizontal scanning line arranged therein with filter elements opposed to the image sensing plane, for separably transmitting at least blue light and green light are alternately arranged and for accumulating image signals associated with the image of the subject; and signal processing means for reading out the image signals accumulated in the image sensing means to produce a color difference signal R−Y in response to color signals obtainable from the picture elements of the color filter of the image sensing device associated with the first horizontal scanning line and color signals obtainable from the picture elements associated with the second horizontal scanning line of a one horizontal scanning time duration before and to produce a color difference signal B−Y in response to color signals obtainable from the picture elements of the image sensing device associated with the second horizontal scanning line and color signals obtainable from the picture elements associated with the first horizontal scanning line of a one horizontal scanning time duration before to thereby produce color difference line sequential signals R−Y and B−Y.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Detailed description will hereunder be given of the preferred embodiment of a system for producing an image signal according to the preferred embodiments with reference to the accompanying drawings.

Figure 1:
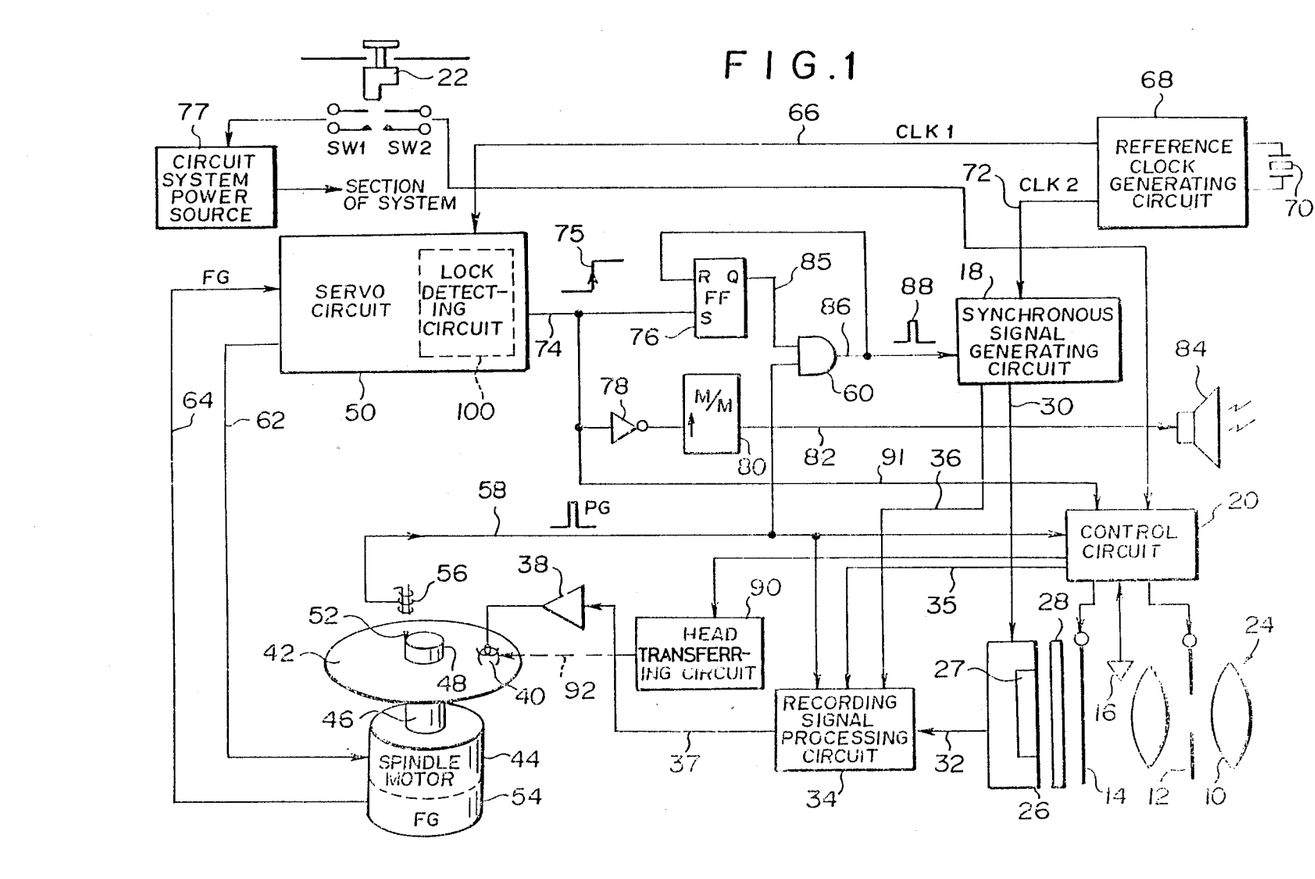
FIG. 1 is a general arrangement diagram showing one embodiment of the system for producing image signals according to the present invention.

FIG. 1 shows the general arrangement of the electronic still camera according to the first embodiment. Referring to the drawing, the electronic still camera comprises an image sensing lens system 10 for making an image of a subject focus, an image sensing optical system 24 including an aperture 12 and an optical shutter 14. This image sensing optical system 24 is connected to a control circuit 20. With respect to exposure control, this control circuit 20 is a control circuit for controlling a shutter 14 and the aperture 12 in response to the operations of a photometric element 16 provided in a light path thereof, a switch SW2 operative in accordance with a shutter release button and a synchronous signal generating circuit 18. In this embodiment, the shutter release button 22 operates in two strokes. In the first stroke thereof, a switch SW1 is closed to make a power source 77 of a circuit system operate in accordance therewith and the power source powers up various sections of the system for producing image signals. With this operation, a servo circuit 50 to be described hereunder starts a driving motor 44 of a magnetic disc 42 as being a rotary recording medium. Further, in the subsequent stroke of the button 22, the control circuit 20 operates to perform shutter releasing, photographing and recording. With the above-described arrangement, wasteful power consumption of the power source such as a battery can be avoided.

Provided at a focal plane of the optical system 24 is a solid state image sensing device 26 having a secondary image sensing cell array such as a CCD. The image sensing device 26 accumulates image signals associated with an image of a subject, which is made to be focused at an image sensing plane 27 in response to driving signals including a vertical synchronous signal and a horizontal synchronous signal, which are delivered from the synchronous signal generating circuit 18 via a control line 30, and outputs the image signals thus accumulated as being serial signals to an output line 32. A color filter 28 having the arrangement shown in FIG. 6(B) or 6(C) is provided in an opposed relationship to the image sensing plane 27 of the solid state imaging sensing device 26.

The output line 32 of the image sensing device 26 is connected to a recording signal processing circuit 34. This recording signal processing circuit 34 is a circuit for frequency-modulating the image signals outputted from the solid state image sensing device 26 by raster scanning in response to the driving signals including the vertical synchronous signal and the horizontal synchronous signals, which are delivered from the synchronous signal generating circuit 18 via a control line 36 and phase pulses PG to be described hereinunder, and further, in response to a record instructing signal delivered from the control circuit 20 via a control line 35, and outputs the image signals thus frequency-modulated as being modulated image signals of a predetermined format to an output line 37. This output line 37 is connected to a magnetic recording head 40 via a recording amplifier 38. Additionally, the recording signal processing circuit 34 will be described in detail hereunder.

The magnetic recording head 40 is a magnetic transducing element carried by a head transfer mechanism conceptionally indicated by a dotted line 92 and transferred onto a vacant track of the magnetic disk 42 by a head transferring circuit 90, for recording image signals into the vacant track. The head transferring circuit 90 is controlled by the control circuit 20. The magnetic disc 42 has a core 48, which is detachably mounted onto a rotary shaft 46 driven by a spindle motor 44 and may be steadily rotated in a predetermined direction by the motor 44, the frequency generator (FG) 54 and the servo circuit 50.

In the magnetic disk 42, 50 tracks are recorded on a magnetic recording sheet having a diameter as small as about 47 mm for example, at a track pitch of about 100 μm, i.e. with a track width of about 50∼60 μm and a guard band width of about 50∼40 μm. The motor 44 steadily rotates the magnetic disk 42 at a predetermined rotary speed N of 3,600 rpm for example, so that recording of image signals at a field or frame speed can be carried out.

The core 48 is provided thereon with a phase generator 52 for generating one phase pulse PG at a predetermined reference rotary phase (angle) per turn of the disc 42. A detecting coil 56 is provided in the proximity of the core 48. This detecting coil 56 is a detector for outputting a phase pulse PG to a signal line 58 when the phase generator 52 passes by the coil 56. This signal line 58 is connected to the control circuit 20, the recording signal processing circuit 34 and one of input terminals of an AND gate 60.

The servo circuit 50 is a motor control circuit having a phase locked loop (PLL) for supplying driving current for the motor 44 to a connecting line 62 and controlling the rotary speed and the rotary phase of the motor 44 in response to a signal frequency FG produced in a signal line 64 by the frequency generator 54 and a reference clock CLK 1 received in a signal line 66 from a reference clock generating circuit 68.

In this embodiment, the frequency generator 54 is preset such that the repeated frequency of the signal FG is one more than integer of a frequency of a color subcarrier wave of an image signal and a satisfactorily higher value than that of the phase pulse PG, e.g. about 20 times higher.

The reference clock generating circuit 68 is a circuit having a crystal oscillating element 70 for generating a clock of stable frequency, for respectively generating in signal lines 72 and 66 a reference clock CLK2 of 14.3 MHz obtained by frequency-dividing an output of the clock and the reference clock CLK1 of a frequency (3.58 MHz) corresponding to the color sub-carrier wave, which is obtained by frequency-dividing an output of reference clock CLK2.

The servo circuit 50 is a circuit having a lock detecting circuit 100 which counts cycles or frequencies of the frequency signal FG by the reference clock 1, so that the motor 44 can maintain the predetermined rotary speed N within a predetermined tolerance, namely, the lock detecting circuit 100 is a circuit for detecting whether a "locked state" is present or not.

An output line 74 of the lock detecting circuit 100 is connected to set the input terminal S of a flip-flop 76 and a monostable circuit (MM) 80 via an inverter 78. An output line 82 of the monostable circuit 80 is connected to an audible signal generator 84 such as a piezo-electric element.

When the output 74 of the lock detecting circuit 100 is lowered from a high level to a low level, the audible signal generator 84 is energized for a predetermined period of time, whereby an audible warning is outputted therefrom. Instead of, or in addition to the audible warning, a visible indication may be outputted from a visible indicator.

On the other band, a lock signal 75 may be delivered to the control circuit 20 via a control line 91.

The output from the flip-flop 76 is also delivered to the control circuit 20 via the control line 91.

A Q output line 85 of the flip-flop 76 is connected to the other terminal of the AND gate 60. An output line 86 of the latter is connected to an R reset input terminal of the flip-flop 76 and a reset input terminal of the synchronous signal generating circuit 18. As apparent from this arrangement, the output 74 of the lock detecting circuit 100 is raised to a high level, i.e. the lock detecting signal 75 is outputted, the flip-flop 76 is set, whereby the input line 85 of the AND gate 60 is energized. As a consequence, a phase pulse PG detected by the coil 56 first after the energization of the input line 85 passes through the AND gate 60 and, inputted into the synchronous signal generating circuit 18 as a reset pulse 88, whereby the circuit 18 is reset.

The synchronous signal generating circuit 18 is a circuit which self-generates various periodical control signals from the reference clock CLK2 of the clock input line 72, and outputs the same to the output lines 30 and 36. Outputted to the output line 30 are sensor driving signals including a picture element clock signal and a 15.7 kHz horizontal line clock signal which drives the image sensing cells of the solid state image sensing device 26 to make the image sensing cells output accumulated electric charges thereof as image signals in response to the vertical and horizontal synchronous signals, for example. Furthermore, outputted to the output line 36 are synchronous signals including a recording control signal to control the recording signal processing circuit 34, and a vertical synchronous signal of 60 Hz and a horizontal synchronous signal.

The synchronous signal generating circuit 18 is reset to the initial state by a reset pulse 88. As a consequence, if the reset timing is determined, thereafter, various control signals can be outputted at the determined phase and in the determined cycle. In this embodiment, these control signals and synchronous signals are outputted to the control lines 30 and 36 such that a still picture image signal of one unit, e.g. one field (1 V), is recorded in one of tracks of the magnetic disc 42 from a position where the vertical synchronous signal is located after a lapse of a predetermined period of time from a phase pulse PG, e.g. a period of time 7 H. As a consequence, unless there is no considerable fluctuation in the rotation of the magnetic disc 42, the vertical synchronous signals thereafter are produced in synchronism with phase pulses PG with a substantial delay of 7 H.

Description will be given of the operation of this system in the case of one shot photographing with reference to FIG. 2.

Figure 2:
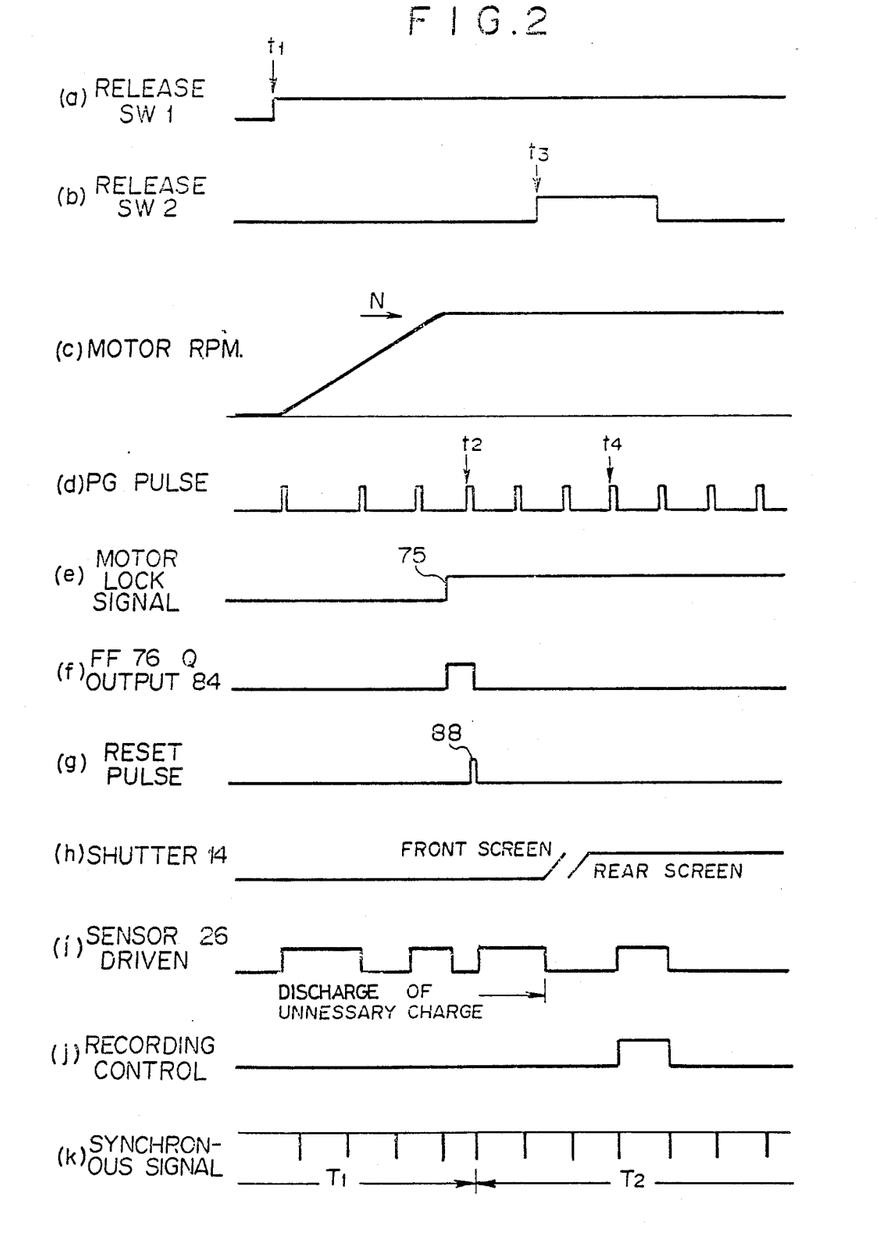
FIG. 2 is a timing chart showing examples of the operations of the electronic still camera illustrated in FIG. 1.

If the shutter release button 22 is operated at a time t1, first, the switch SW1 is closed (FIG. 2(a)). Then, the power source powers up the circuits of this system and the motor 44 starts rotating (FIG. 2(c)). The synchronous signal generating circuit 18 drives the solid state image sensing device 26 to discharge the electric charges remaining the image sensing cells (FIG. 2(i)). As the rotary speed is increased, the detecting coil 56 begins to output the phase pulses PG (FIG. 2(d)), and the repeated cycles these of are gradually shortened. The phase PG are fed to the gate 60, the control circuit 20 and the recording signal processing circuit 34. Simultaneously with this, the frequency signal FG produced by the frequency generator 54 shortens its cycle and finally falls into the "locked" state. More specifically, as the rotary speed of the motor 44 approaches the predetermined value N and a counted value of a counter in the lock detecting circuit 100 of FIG. 1 comes to be included within a predetermined lock range L, the lock signal 75 (FIG. 2(e)) is outputted from a detecting circuit 100, whereby the flip-flop 76 is set (FIG. 2(f)), so that one of input terminals of the AND gate 60 is energized. Furthermore, this lock signal 75 (FIG. 2(e)) is inputted to the control circuit 20 via the control line 91. After this time, the shutter 14 may be released to expose the image sensing plane 27.

In this state, if a phase pulse PG comes from the coil 56 at a time t2 for example, then the phase pulse PG raises an output from the gate 60 the high level to produce a reset pulse 88 (FIG. 2(g). With this operation, the flip-flop 76 and the synchronous signal generating circuit 18 are reset. Additionally, as shown in FIG. 2(k), during a period of time T1 before the time t2, the synchronous signal generating circuit 18 has been producing synchronous signals in a random phase. However, during a period of time T2 after the generation of the reset pulse 88, the synchronous signals are outputted substantially in synchronism with the phase pulses PG. FIG. 2(k) exemplifies the vertical synchronous signal.

The control circuit 20 can read in a signal showing the state of the switch SW2 (FIG. 2(b)) in response to an input of the lock signal 75. Furthermore, the control circuit 20 stops its operation for the solid state image sensing device 26 after the final discharge of the remaining electric charges (FIG. 2(i)).

Now, as shown in FIG. 2, for example, when the shutter release button 22 enters the second stroke at a time t3, the control circuit 20 operates in accordance therewith to release the shutter 14. The period of time of release depends on an intensity of illumination of an incident ray detected by the photometric element 16. Additionally, the switch SW2 itself performs a non-lock operation, however, in FIG. 2, for explanatory convenience sake, there is shown a state signal in the control circuit 20, which rises in response to the closing of the switch SW2, and thereafter, the risen state is latched until the recording operation to be described hereinunder is completed. The control circuit 20 can read in the state of this signal by operating in response to the lock signal delivered via the control line 91. The synchronous signal generating circuit 18 comes into synchronism with a phase pulse PG coming in first after the closing of the shutter 14 (at a time t4) to drive the solid state image sensing device 26, to thereby make the image sensing device discharge the accumulated electric charge (FIG. 2(i)). On the other hand, the control circuit 20 gives a command to the recording signal processing circuit 34 to record image signals into the magnetic disc 42 by a signal PG coming into the control circuit 20 first after the closing of the shutter (FIG. 2(j)). With this operation, the electric charge accumulated in the image sensing device 26 is read out and recorded into a track of the magnetic disc 42 by the recording signal processing circuit 34 at a predetermined phase to a position where the pulse PG is generated, i.e. a position delayed by the period of time 7 H. Upon completion of the recording, the control circuit 20 restores the signal (FIG. 2(b)) showing the state of the switch SW2 to the initial state, and controls the head transferring circuit 90 to transfer the head to the subsequent track position, whereby the system as a whole is restored to the idle state.

Figure 3:
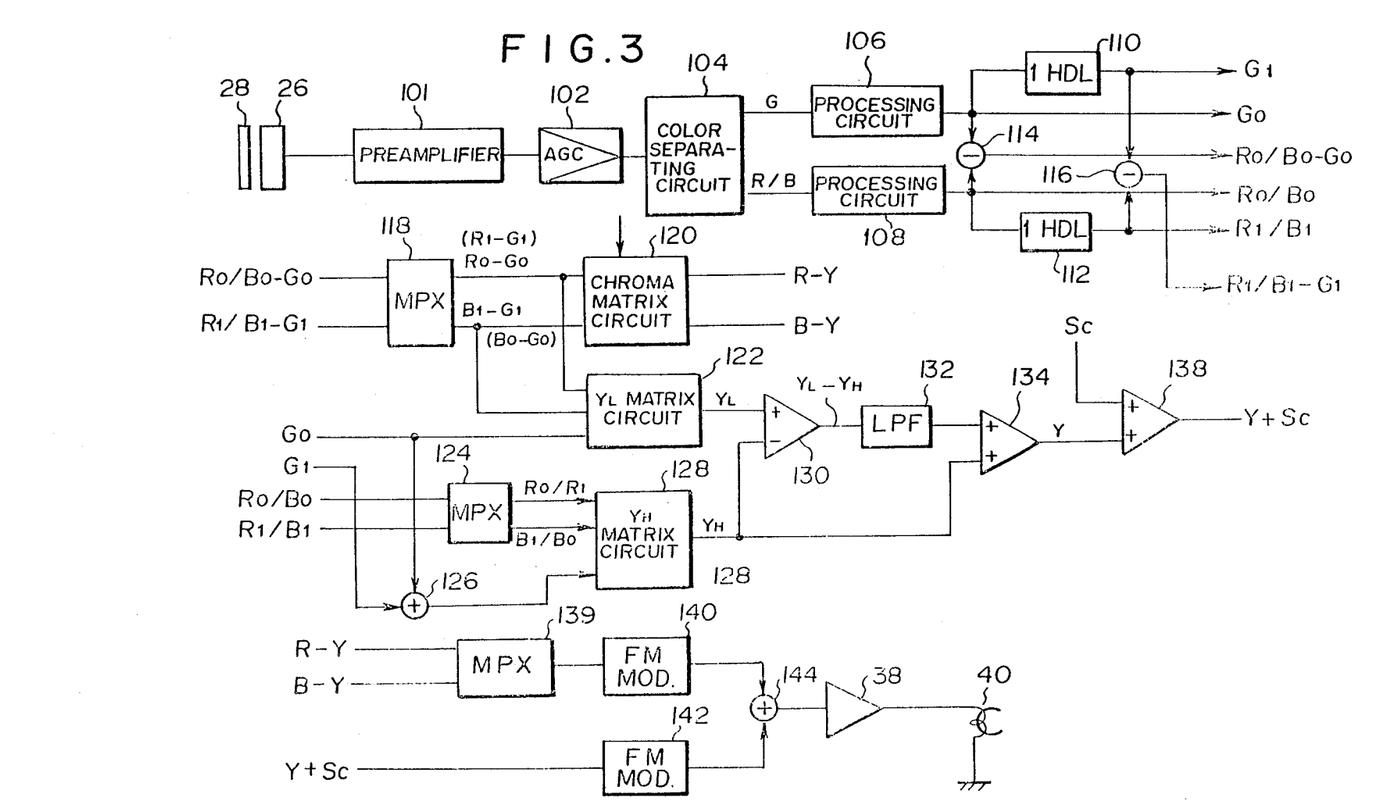
FIG. 3 is a block diagram showing the specific arrangement of the recording signal processing circuit in FIG. 1.

Next, FIG. 3 shows the specific arrangement of the recording signal processing circuit 34. Referring to the drawing an image signal associated with the image of the subject made to be focused at the image sensing plane of the solid state image sensing device 26 via the color filter 28 is amplified to a predetermined level by a preamplifier 101 and an AGC (Automatic Gain Control) circuit 102, and inputted to a color separating circuit 104. The image signal is separated by the color separating circuit 104 into a signal G and a signal R/B, which are inputted into processing circuits 106, and 108, respectively. Here, the signal R/B means the signals R and B which are turned to be line sequential, and either the signal R or the signal B is obtained from the respective horizontal scanning lines of the color filter. In the processing circuits 106 and 108, color signal processing such as γ correction is performed, whereby a signal G0 is outputted from the processing circuit 106 and a signal R0/B0 from the processing circuit 108.

Further, the output signals from the processing circuits 106 and 108 are delayed by one horizontal scanning time duration (1 H) through 1 H delay lines 110 and 112 and turned into a signal G1 and a signal R1/B1, respectively. Here, the signal G0 and the signal R0/B0 are color signals respectively obtained from the picture elements of the image sensing device 26, which are associated with the horizontal scanning lines of the color filter 28 during scanning at present, while, the signal G1 and the signal B1/B1 are signals obtained from the horizontal scanning lines 1 H before. As described above, the affix "0" means a signal obtainable from the horizontal scanning line during scanning at present, the affix "1" means a signal obtained from the horizontal scanning line 1 H before, respectively, and the rest is the same as above.

Furthermore, the output signals from the processing circuits 106 and 108 are inputted to a subtracter 114, where substraction is made by the substracter 114, to thereby be turned into a signal R0/B0−G0. Similarly, the output signals from the 1 H delay lines 110 and 112 are inputted into a substractor 116, where substraction is made by the subtractor 116, to thereby be turned into a signal R1/B1−G1.

The signals R0/B0−G0 and R1/B1−G1 are selectively inputted into a chroma matrix circuit 120 via a multiplexer 118. As conceptionally indicated by an arrow mark, the matrix circuit 120 switchingly processes the calculations made in accordance with the aforesaid formula (2) and (3) in association with the horizontal scanning line being read out from the solid state image sensing device at present. Whereby, in response to the input signals R0−G0 and B1−G1, the color difference signal R−Y is outputted as a line sequential signal in association therewith, and, in response to the input signals R1−G1 and B0−G0, the color difference signal B−Y is outputted as a line sequential signal in association therewith, respectively.

On the other hand, inputted into a $Y_L$ matrix circuit 122 are output signals from the multiplexer 118 and the processing circuit 106, and a brightness signal $Y_L$ is produced by the $Y_L$ matrix circuit 122. Here, the brightness signal $Y_L$ is a signal in the same band (0.7 MHz) as the color difference signals, and, to contribute to the reproduction of a color image, the brighness signal $Y_L$ is produced in accordance with the theoretically accurate relationship as shown below.

$$Y_L = 0.11(B0-G0) + 0.30(R1-G1) + G0 \quad (4)$$

or $$Y_L = 0.11(B1-G1) + 0.30(R0-G0) + G0 \ldots \quad (5)$$

Here, the formula (4) is applied when the blue color signal B0 and the green color signal G0 are obtained from the horizontal scanning line during scanning at present, i.e. the horizontal scanning line in the color filter 28 wherein the picture elements are arranged by means of the blue color filters $F_B$ and the green color filters $F_G$ is scanned. Furthermore, the formula (5) is applied when the horizontal scanning line in the color filter 28 within the picture elements are arranged by means of the red color filters $F_R$ and the green color filters $F_G$ are scanned.

Furthermore, inputted into a $Y_H$ matrix circuit 128 are the signals R0/B0 and R1/B1 via a multiplexer 124, and further, the signals G0 and G1 via an adder 126. In the $Y_M$ matrix circuit, these input signals are calculated in accordance with the following formula, whereby a brightness signal $Y_H$ is produced.

$$Y_H = 0.25(R1+B0) + 0.25(G0+G1) \quad (6)$$

or $$Y_H = 0.25(R0+B1) + 0.25(G0+G1) \quad (7)$$

Figure 4:
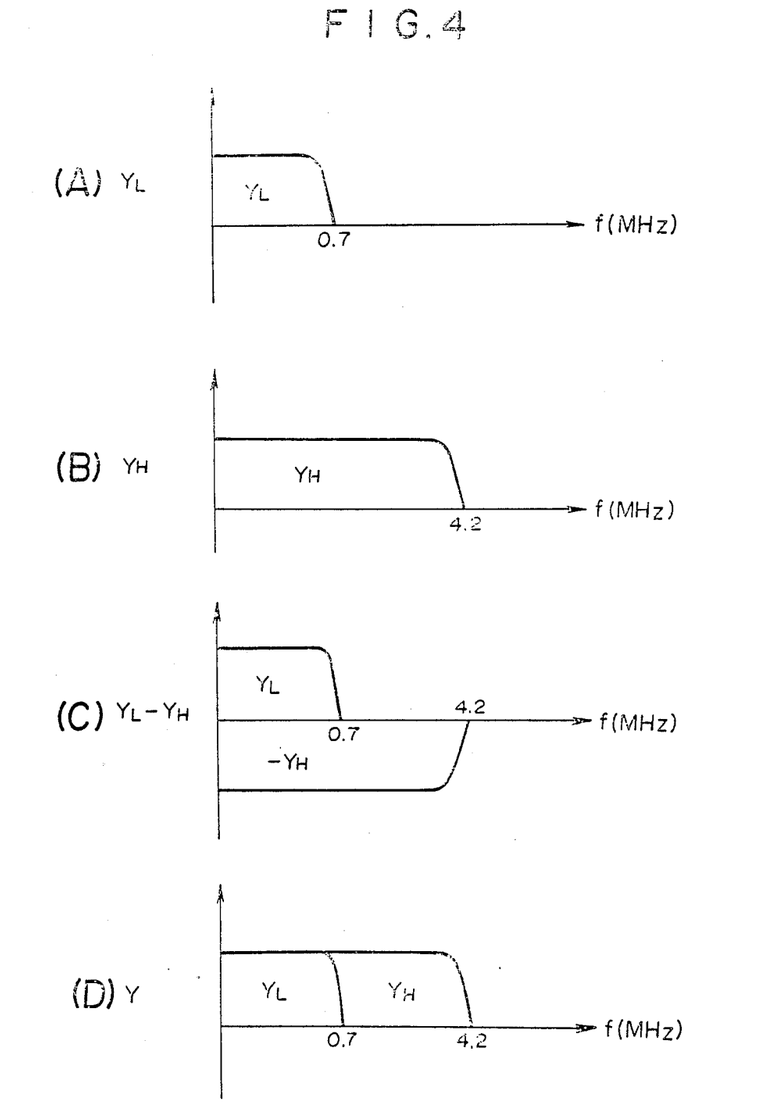
FIG. 4 is a frequency characteristics diagram showing a process for producing a brightness signal Y from brightness signals $Y_L$ and $Y_H$.

Here, the formula (6) is applied when the blue color signal B0 and the green color signal G0 are obtained from the horizontal scanning line during scanning at present, and the formula (7) is applied when the red color signal R0 and the green color signal G0 are obtained from the horizontal scanning line during scanning at present, respectively. The brightness signal $Y_H$ has a ratio of R:B:G=1:1:2 and is produced such that the signal band thereof is 4.2 MHz. Since the signal band of the brightness signal associated with the color reproduction is up to 0.7 MHz and only the monochrome image signal is present in the signal band thereabove, the electronic still camera according to the present invention has been developed to achieve excellent results by means of an adder circuit 130, a low pass filter 132 and an adder circuit 134 such that the brightness signal $Y_L$ produced in accordance with the strict calculating formula is used in the signal band of 0.7 MHz or therebelow and the brightness signal $Y_H$ produced to improve the resolution when monochrome image signals are reproduced is used in the signal band of 0.7 MHz to 4.2 MHz. More specifically, the brightness signal $Y_L$ and $Y_H$ (FIGS. 4(a) and 4(b)) which are outputted from the $Y_L$ matrix circuit 122 and the $Y_H$ matrix circuit 128 are inputted into an adder circuit 130 and turned into a signal $Y_L - Y_H$ (FIG. 4(c)) after calculations are made in the adder circuit 130, and further, inputted into one of input terminals of an adder circuit 134 via the low pass filter 132 allowing only the signals of the frequency band of 0.7 MHz or therebelow to pass therethrough.

On the other hand, the brightness signal $Y_H$ is inputted into the other of the input terminals of the adder circuit 134 from the $Y_H$ matrix circuit 128. In the adder circuit 134, an output signal from the low pass filter 132 is added to the brightness signal $Y_H$ in positive polarities, whereby a brightness signal Y shown in FIG. 4(d) is produced. More specifically, the brightness signal Y is produced such that the brightness signal Y becomes the brightness signal $Y_L$ in the frequency band 0.7 MHz or therebelow and becomes the brightnesses signal $Y_H$ in the frequency band of 0.7 MHz to 4.2 MHz as shown in FIG. 4(d).

The brightness signal Y thus produced is added to a color synchronous signal Sc by an adder circuit 138 to be turned into a signal Y+Sc and inputted into a FM modulator 142.

On the other hand, the color difference signals R−Y and B−Y are inputted into an FM modulator 140 by a multiplexer 139. The color difference signals R−Y and B−Y are FM-modulated by the FM modulator 140 and the signal Y+Sc is FM-modulated by the FM modulator 142, respectively, thereafter, addition is performed by an adder 144, and outputted to the magnetic recording head 40 via the recording amplifier 38.

Figure 5:
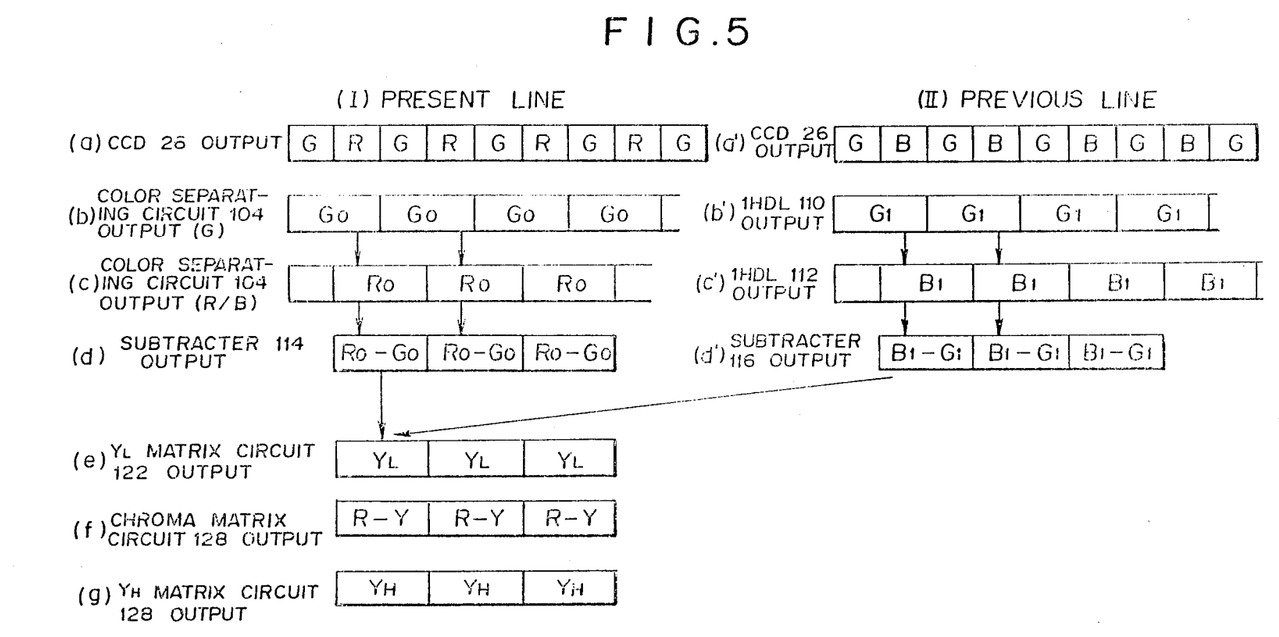
FIG. 5 is an explanatory view showing the processing of signals in respective circuit portions of the recording signal processing circuit illustrated in FIG. 4.

FIG. 5 shows timings of operations in the circuit portions of the recording signal processing circuit, wherein (a)∼(d) in (I) show the processing conditions of the color signals obtainable from the horizontal scanning line during scanning at present, and (a')∼(d') in (II) show the processing conditions of the color signals obtained from the horizontal scanning line 1 H before. Furthermore, (e) in (I) shows the output timing of the brightness signal $Y_L$ produced in response to the signals outputted from the subtractors 114 and 116, (f) shows the output timing of the color difference signal (R−Y in this case) outputted from the chroma matrix circuit 120 and (g) shows the output timing of the brightness signal $Y_H$ outputted from the $Y_H$ matrix circuit 128.

In this embodiment, description has been given of the case where the color filter using the additive color type color filter has been used, however, the present invention need not necessarily be limited to this, and the complementary color type color filter may be used. In this case, filter elements for transmitting only yellow light may be arranged instead of the filter elements for transmitting only the red light, and filter elements for transmitting only cyan light may be arranged instead of the filter elements for transmitting only the blue light.

Further, in the embodiment of the present invention, description has been given of the electronic still camera, however, the present invention need not necessarily be limited to this, and, needless to say, the present invention may be applied to a VTR and the like.

(Advantage of the Present Invention)

As has been described hereinabove, according to the present invention, the system for producing image signals is of such an arrangement that the line sequential color difference signal R−Y is produced in response to the color signals obtained from the picture elements of the image sensing device associated with the horizontal scanning line arranged therein with the filter elements for transmitting only the red light of the color sequential type color filter included in the image sensing means and the color signals obtainable from the picture elements of the image sensing device associated with the horizontal scanning line one horizontal scanning time duration before, said horizontal scanning line being arranged therein with the filter elements for transmitting only the blue light, and further, the line sequential color difference signal B−Y is produced in response to the color signals in response to the color signals obtained from the picture elements of the image sensing device associated with the horizontal scanning line arranged therein with the filter elements for transmitting only the blue light and the color signals obtainable from the picture elements of the image sensing device associated with the horizontal scanning line one horizontal scanning time duration before said horizontal scanning line being arranged therein with the filter elements for transmitting only the red light, so that, according to the present invention, the image signal including the line sequential color difference signals can be produced with the simplified circuits without impairing the color productivity.

It should be understood, however, that there is no intention to limit the invention to the specific forms disclosed, but on the contrary, the invention is to cover all modifications, alternate constructions and equivalent falling within the spirits and scope of the invention as expressed in the appended claims.

What is claimed is:

1. A system for producing image signals, comprising:
   image sensing means for picking up an image of a subject, said image sensing means comprising an image sensing device and a color filter formed thereon, said image sensing device comprising alternately-arranged first and second horizontal scanning lines of picture elements, said color filter comprising filter elements opposed to said picture elements of said image sensing device, wherein filter elements opposed to picture elements of said first horizontal scanning lines comprise alternately-arranged filter elements for separably transmitting at least red light and green light, and wherein filter elements opposed to picture elements of said second horizontal scanning lines comprise alternately-arranged filter elements for separably transmitting at least blue light and green light, said picture elements accumulating color image signals representing said image of said subject; and signal processing means for reading out said color image signals accumulated in said picture elements of said image sensing device to produce a color difference signal $R-Y$ in response to color image signals read out from the picture elements of a first horizontal scanning line and color image signals read out from the picture elements of a second horizontal scanning line one horizontal scanning line duration before and to produce a color difference signal $B-Y$ in response to color image signals read out from the picture elements of a second horizontal scanning line and color image signals read out from the picture elements of a first horizontal scanning line one horizontal scanning line duration below, thereby producing line-sequential color difference signals $R-Y$ and $B-Y$.

2. The system for producing image signals as set forth in claim 1, wherein said signal processing means comprises:

color separating means for separating the color image signals read out of said image sensing device into G0 amd R0/B0 color signals;

delay means for delaying the G0 and R0/B0 color signals by one horizontal scanning line duration to produce G1 and R1/B1 color signals, respectively;

first subtracting means for producing an R0/B0−G0 difference signal from the G0 and R0/B0 color signals;

second subtracting means for producing an R1/B1−G1 difference signal from the G1 and R1/B1 color signals;

first multiplexing means for receiving the R0/B0−G0 and R1/B1−G1 difference signals and selectively outputting either R0−G0 and B1−G1 signals or R1−G1 and B0−G0 signals depending on whether said signal processing means is presently reading out the color image signals accumulated in the picture elements of either a first or second horizontal scanning line, respectively; and chroma matrix means for producing an R−Y color difference signal when said first multiplexing means outputs R0−G0 and B1−G1 signals, and for producing a B−Y color difference signal when said first multiplexing means outputs R1−G1 and B0−G0 signals, said chroma matrix means producing said R−Y and B−Y color difference signals in accordance with respective predetermined calculating formulae.

3. The system for producing image signals as set forth in claim 2, wherein said chroma matrix means produces the R−Y and B−Y color difference signals in accordance with the following formulae $$R-Y=0.7(R0-G0)-0.11(B1-G1)$$

and $$B-Y=0.89(B0-G0)-0.30(R1-G1).$$

4. The system for producing image signals as set forth in claim 3, further comprising $Y_L$ matrix means for producing a $Y_L$ narrow-gand brightness signal having the same bandwidth as the R−Y and B−Y color difference signals from the R0−G0 and B1−G1 signals and the R1−G1 and B0−G0 signals outputted from said first multiplexing means and the G0 color signal in accordance with the following formulae $$Y_L=0.11(B0-G0)+0.30(R1-G1)+G_0$$

and $$Y_L=0.11(B1-G1)+0.30(R0-G0)+G0.$$

5. The system for producing image signals as set forth in claim 4, further comprising:

first adding means for producing a summation signal from the G0 and G1 color signals;

second multiplexing means for receiving the R0/B0 and R1/B1 color signals and selectively outputting either R0 and B1 signals or R1 and B0 signals depending on whether said signal processing means is presently reading out the color image signals accumulated in the picture elements of either a first or second horizontal scanning line, respectively; and $Y_H$ matrix means for receiving said summation signal and said R0 and B1 sivgnals and said R1 and B0 signals and for producing a $Y_H$ wide-band brightness signal having a wider bandwidth than the R−Y and B−Y color difference signals from signals and said R1 and B0 signals in accordance with the following formulae $$Y_H=0.25(R1+B0)+0.25(G0+G1)$$

and $$Y_H=0.25(R0+B1)+0.25(B0+G1).$$

6. The system for producing image signals as set forth in claim 5, further comprising:

second adding means for producing a $Y_L-Y_H$ signal from a calculation of the $Y_L$ and $Y_H$ brightness signals which are produced by said $Y_L$ matrix means and said $Y_H$ matrix means, respectively;

low pass filter means for producing a filtered signal having the same bandwidth as the R−Y and B−Y color difference signals by filtering $Y_L-Y_H$ signal from said second adding means; and third adding means for adding said filtered signal rom said low pass filter means and said $Y_H$ brightness signal from said $Y_H$ matrix means to produce a Y brightness signal.

7. The system for producing image signals as set forth in claim 3, further comprising:

first adding means for producing a summation signal from the G0 and G1 color signals;

second multiplexing means for receiving the R0/B0 and R1/B1 color signals and selectively outputting either R0 and B1 signals or R1 and B0 signals depending on whether said signal processing means is pre;sently reading out the color image signals accumulated in the picture elements of either a first or second horizontal scanning line, respectively; and $Y_H$ matrix means for receiving said summation signal and said R0 and B1 signals and said R1 and B0 signals and for producing a $Y_H$ wide-band brightness signal having a wider bandwidth than the $R-Y$ and $B-Y$ color difference signals from said R0 and B1 signals and said R1 and B0 signals in accordance with the following formulae $$Y_H=0.25\ (R1+B0)+0.25\ (G0+G1)$$

and $$Y_H=0.25\ (R0+B1)+0.25\ (G0+G1).$$

8. The system for producing image signals as set forth in claim 2, further comprising $Y_L$ matrix means for producing a narrow-band brightness signal having the same bandwidth as the $R-Y$ and $B-Y$ color difference signals from the R0−G0 and B1−G1 signals and the R1−G1 and B0−G0 signals outputted from said first multiplexing means and the G0 color signal in accordance with the following formulae $$Y_L=0.11\ (B0-G0)+0.30\ (R1-G1)+G0$$

and $$Y_L=0.11\ (B1-G1)+0.30\ (R0-G0)+G0.$$

9. The system for producing image signals as set forth in claim 8, further comprising:
first adding means for producing a summation signal from the G0 and G1 color signals;
second multiplexing means for receiving the R0/B0 and R1/B1 color signals and selectively outputting either R0 and B1 signals or R1 and B0 signals depending on whether said signal processing means is presently reading out the color image signals accumulated in the picture elements of either a first or second horizontal scanning line, respectively; and
$Y_H$ matrix means for receiving said summation signal and said R0 and B1 signals and said R1 and B0 signals and for producing a $Y_H$ wide-band brightness signal having a wider bandwidth than the $R-Y$ and $B-Y$ color difference signals from said R0 and B1 signals and said R1 and B0 signals in accordance with the following formulae $$Y_H=0.25\ (R1+B0)+0.25\ (G0+G1)$$

and $$Y_H=0.25\ R0+B1)+0.25\ (G0+G1).$$

10. The system for producing image signals as set forth in claim 9, further comprising:
second adding means for producing a Y-$Y_H$ signal from a calculation of the $Y_L$ and $Y_H$ brightness signals, which are produced by said $Y_L$ matrix means and said $Y_H$ matrix means, respectively;
low pass filter means for producing a filtered signal having the same bandwidth as the $R-Y$ and $B-Y$ color difference signals by filtering $Y_L-Y_H$ signal from said second adding means; and
third adding means for adding said filtered signal from said low pass filter means and said $Y_H$ brightness signal from said $Y_H$ matrix means to produce a Y brightness signal.

11. The system for producing image signals as set forth in claim 10, wherein said $R-Y$ and $B-Y$ color difference signals have a bandwidth of 0.7 MHz.

12. The system for producing image signals as set forth in claim 2, further comprising:

first adding means for producing a summation signal from the G0 and G1 color signals;
second multiplexing means for receiving the R0/B0 and R1/B1 color signals and selectively outputting either R0 and B1 color signals of R1 and B0 signals depending on whether said signal processing means is presently reading out the color image signals accumulated in the picture elements of either a first or second horizontal scanning line, respectively; and
$Y_H$ matrix means for receiving said summation signal and said R0 and B1 color signals and said R1 and B0 color signals and for producing a $Y_H$ wide-band brightness signal having a wider bandwidth than the $R-Y$ and $B-Y$ color difference signals from said R0 and B1 color signals and said R1 and B0 color signals in accordance with the following formulae $$Y_H=0.25\ (R1+B0)+0.25\ (G0+G1)$$

and $$Y_H=0.25\ (R0+B1+0.25\ (G0+G1).$$

13. The system for producing image signals as set forth in claim 1, wherein the alternately-arranged first and second horizontal scanning lines comprise alternately-arranged pairs of first horizontal scanning lines and pairs of second horizontal scanning lines;
wherein the filter elements opposed to the picture elements of the first horizontal scanning lines comprise alternately-arranged filter elements for separably transmitting green and red light;
wherein the filter elements opposed to the picture elements of the second horizontal scanning lines comprise alternately-arranged filter elements for separably transmitting green and blue light; and
wherein the signal processing means reads out the color image signals accumulated in the picture elements of a first line of each of the pairs of first and second horizontal scanning lines during first field intervals, and reads out the color image signals accumulated in the picture elements of a second line of each of the pairs of first and second horizontal scanning lines during second field intervals.

14. The system for producing image signals as set forth in claim 13, wherein said signal processing means comprises:
color separating means for separating the color image signals read out of said image sensing device into G0 amd R0/B0 color signals;
delay means for delaying the G0 and R0/B0 color signals by one horizontal scanning time duration to produce G1 and R1/B1 color signals, respectively;
first subtracting means for producing an R0/B0−G0 difference signal from the G0 and R0/B0 color signals;
second subtracting means for producing an R1/B1-G1 difference signal from the G1 and R1/B1 color signals;
first multiplexing means for receiving the R0/B0−G0 and R1/B1−G1 difference signals and selectively outputting either R0−G0 and B2−G1 signals or R1−G1 and B0−G0 signals depending on whether said signal processing means is presently reading out the color image signals accumulated in the picture elements of either a first or second horizontal scanning line, respectively; and chroma matrix means for producing an R−Y color difference signal when said first multiplexing means outputs R0−G0 and B1−G1 signals, and for producing a B−Y color difference signal when said first multiplexing means outputs R1−G1 and B0−G0 signals said chroma matrix means producing said R−Y and B−Y color difference signals in accordance with respective predetermined calculating formulae.

15. The system for producing image signals as set forth in claim 13, wherein the filter elements comprise pairs of vertical lines of filter elements;

wherein the filter elements in a first line of each of the pairs of vertical lines comprise alternately-arranged first and second pairs of filter elements, wherein filter elements in the first pairs are for separably transmitting red light and filter elements in the second pairs are for separably transmitting green light; and wherein the filter elements in a second line of each of the pairs of vertical lines comprise alternately-arranged third and fourth pairs of filter elements, wherein filter elements in the third pairs are for separably transmitting green light and filter elements in the fourth pairs are for separably transmitting blue light.

16. The system for producing image signals as set forth in claim 13, wherein the filter elements comprise pairs of vertical lines of filter elements;

wherein the filter elements in a first line of each of the pairs of vertical lines are for separably transmitting green light; and wherein the filter elements in a second line of each of the pairs of vertical lines comprise alternately-arranged first and second pairs of filter elements, wherein filter elements in the first pairs are for separably transmitting red light and filter elements in the second pairs are for separably transmitting blue light.

* * * * *